350-96.1 SR
XR 3,604,840
SEARCH ROOM

United State... [11] 3,604,840

SUBSTITUTE FOR MISSING XR

[72] Inventor John V. Sharp
West Hurley, N.Y.
[21] Appl. No. 791,274
[22] Filed Jan. 15, 1969
[45] Patented Sept. 14, 1971
[73] Assignee International Business Machines Corporation
Armonk, N.Y.

[54] COLOR ENCODER
7 Claims, 9 Drawing Figs.

[52] U.S. Cl. .......... 178/5.4 R, 178/DIG. 3, 178/6 R, 209/111.6, 356/173
[51] Int. Cl. .......... H04m 5/42
[50] Field of Search .......... 250/226; 340/146.3; 178/5.4 R, 5.4 CD, DIG. 3; 179/15.55 R, 15.55 T; 209/111.6

[56] References Cited
UNITED STATES PATENTS

| | | | |
|---|---|---|---|
| 2,978,535 | 4/1961 | Brown | 179/15.55 |
| 3,181,987 | 5/1965 | Polevitzky | 178/5.2 |

*Primary Examiner*—Robert L. Griffin
*Assistant Examiner*—Donald E. Stout
*Attorneys*—Hanifin and Jancin and Joseph J. Connerton

ABSTRACT: A color encoder for encoding the colors detected in scanning a document which detects the first region among a contiguous set of regions of equal area containing a color other than background color. If any other regions contain a color other than said first region (not including background), this is also detected. It records which regions contain a color and which regions contain background, the color of the first region which contains a color, and whether any of the other regions contains a different color.

INVENTOR
JOHN V. SHARP

BY

ATTORNEY

ALTERNATE COLOR ENCODER (FOR FIG. 3)

COLOR ENCODER

GOVERNMENT CONTRACT

The invention herein described was made in the course of or under a contract with the Department of the Army.

CROSS-REFERENCE TO A RELATED APPLICATION

U.S. Pat. application, Ser. No. 762,517, filed Sept. 25, 1968, "Method and Scanning Apparatus for Color Separation and Identification" by Donald R. Thompson is a related application which discloses a color detector which supplies the data encoded by the invention of the present application.

BACKGROUND OF THE INVENTION

The invention relates to color systems and specifically color systems preparing colors for transmission on telegraphy systems capable of reproduction at the receiving station in the original color.

DESCRIPTION OF THE PRIOR ART

In prior art scanning techniques a multicolored document was either scanned as many times as there was colors or only once. In the former systems the document would be divided into a number of regions of equal area. The first scan would search for one color, the second another, and so forth until all colors were scanned. If in any region a color was present, a one would be recorded, and if no color was present, a logical zero. By marking the beginning of each scan and scanning for the colors always in the same order, it was possible to transmit the colors of a multicolor document by digital data so that the original document could be reconstructed from the recorded data by merely recognizing which area the logical zero or one represented, and during which scan the recording was made.

The one-scan method of transmitting multicolor documents was also to divide the document into a number of regions of equal areas. By this method the document was scanned only once. However, it was necessary to relegate a certain number of digital bits to each region. That is, if the document was an eight-color document, it was necessary to reserve three digital bits for each region so that a digital number between 000 and 111 could be assigned to each of the eight colors.

By both of these methods a tremendous amount of digital data is generated. The number of bits necessary in the first is $n\times N$, in the second N $\log_2 n$ where $n$ equals the number of colors and N equals the number of regions.

It is an object of this invention to reduce the amount of digital data necessary to record the color patterns upon a document and still be able to reconstruct the document at a later time.

SUMMARY OF THE INVENTION

The invention reduces the amount of digital data necessary to represent a multicolored document. This can be accomplished with only one scan of the document. The document is divided into a number of regions of equal area; each elemental region is scanned simultaneously by two fiber optic elements. The outputs of these fiber optics are monitored by photocells whose outputs are then color-decoded and the colors represented by a digital number. Further, the invention takes a number of contiguous regions and represents each region by a one if a color is present and a zero if no color is present (background color). Next, the invention records digitally the number representing the color of the first contiguous region that contains a color. If any of the other regions also contains a color, and if this color is different than the other regions contained in the contiguous group, this is also indicated by a logical one in the last binary bit.

More particularly, the preferred embodiment of the invention scans a multicolor document containing eight colors and a background color, the background color being one which reflects as a neutral color which is uniform across the frequency bandwidth utilized and is of an intermediate level between black and white. Examples of such documents are maps, flow charts, topographical studies, etc. The invention described assumes that all lines have a mean width of at least 8 mils and, except for intersecting lines, are at least 8 mils apart. However, this is only an example, and any other size lines are possible, as long as they can be detected by the fiber optics. It has been found necessary when scanning 8-mil lines to use 4-mil square scan regions because of the possibility that a line might not be 8 mils wide due to inking error, reproduction error, etc. Without the specified ratios of scan area to line width unacceptable errors would occur. Scanning is accomplished by two sets of fiber optics receiving light reflected off the document through a dichroic mirror. The outputs of the fiber optics are sensed by photocells whose outputs are amplified and decoded for the color scanned on a document. These colors are then compacted according to the invention, that is, the first color in a group of contiguous areas is recorded and also recorded is whether any of the other areas in the contiguous area have a different color. Simultaneous with the color-decoding, in the preferred embodiment, there is present another data compaction scheme. That is, since the document has lines which are normally 8 mils wide and the document is divided into 4-mil square regions, a redundancy of information should be present. This redundancy is removed from the contiguous regions scanned by the data compactor. The data compactor indicates which of the regions in the contiguous region contains a color. This information, which regions contain a color, along with the color of the first region which contains a color other than background and, if present, the indication whether the other regions contain a different color, is recorded onto magnetic tape.

The foregoing and other objects, features and advantages of the invention will be apparent from the following more particular description of preferred embodiments of the invention as illustrated in the accompanying drawings.

Figure 1:
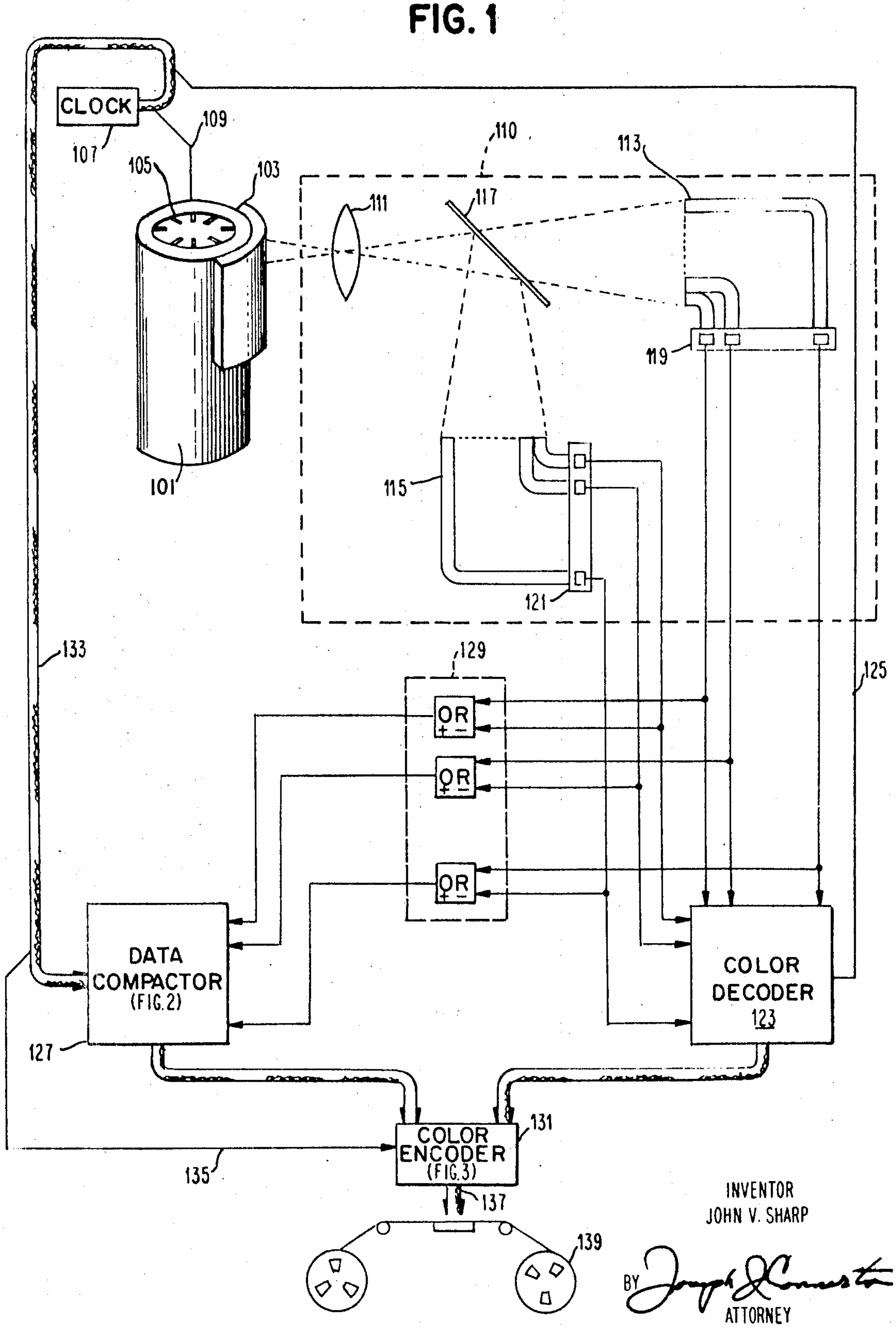
FIG. 1 is a drawing of an application employing the preferred embodiment of the invention.
Figure 3A:
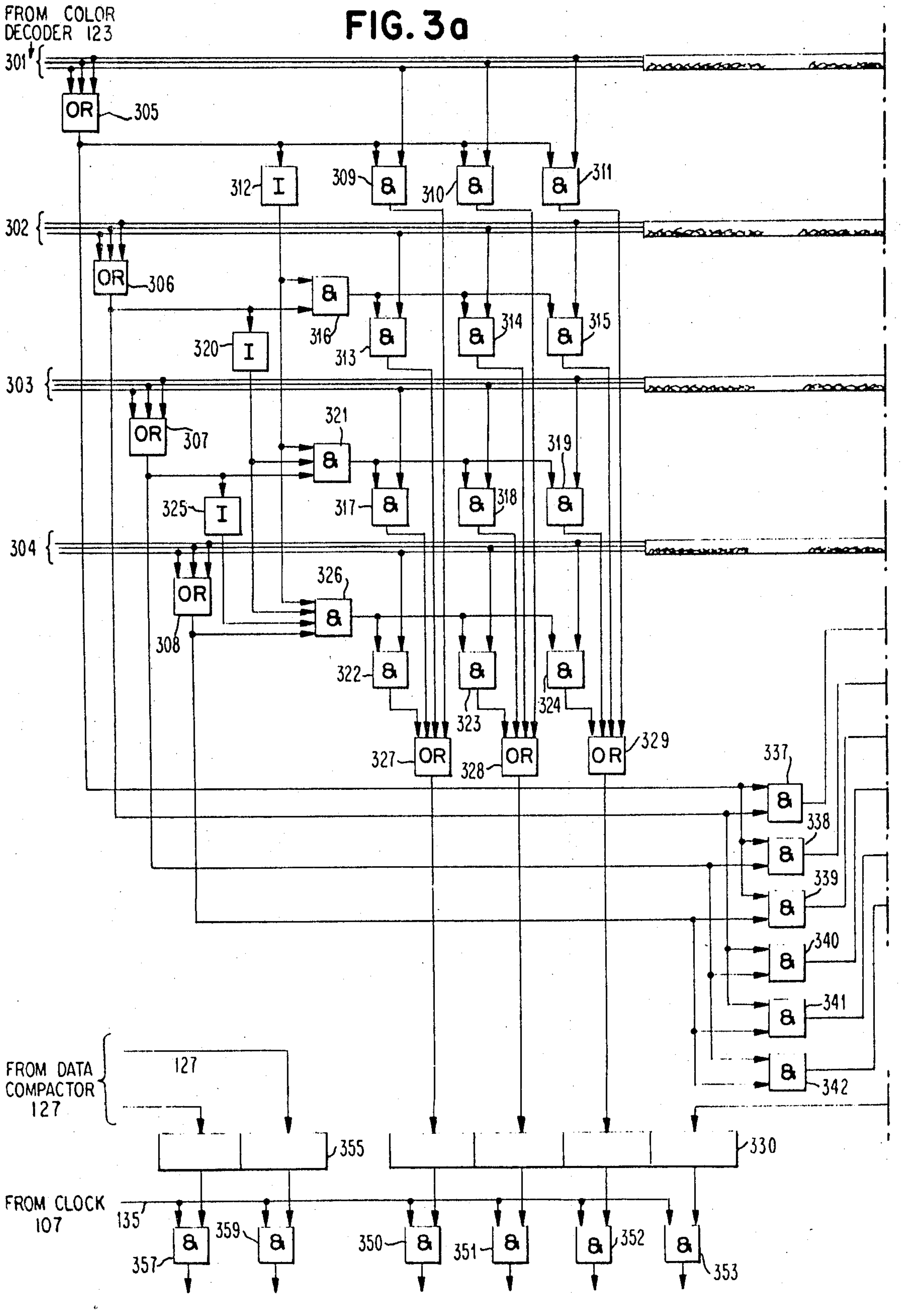
FIGS. 3*a* and 3*b* are the preferred embodiment of the invention and are a more detailed drawing of color-encoder 131.
Figure 3B:
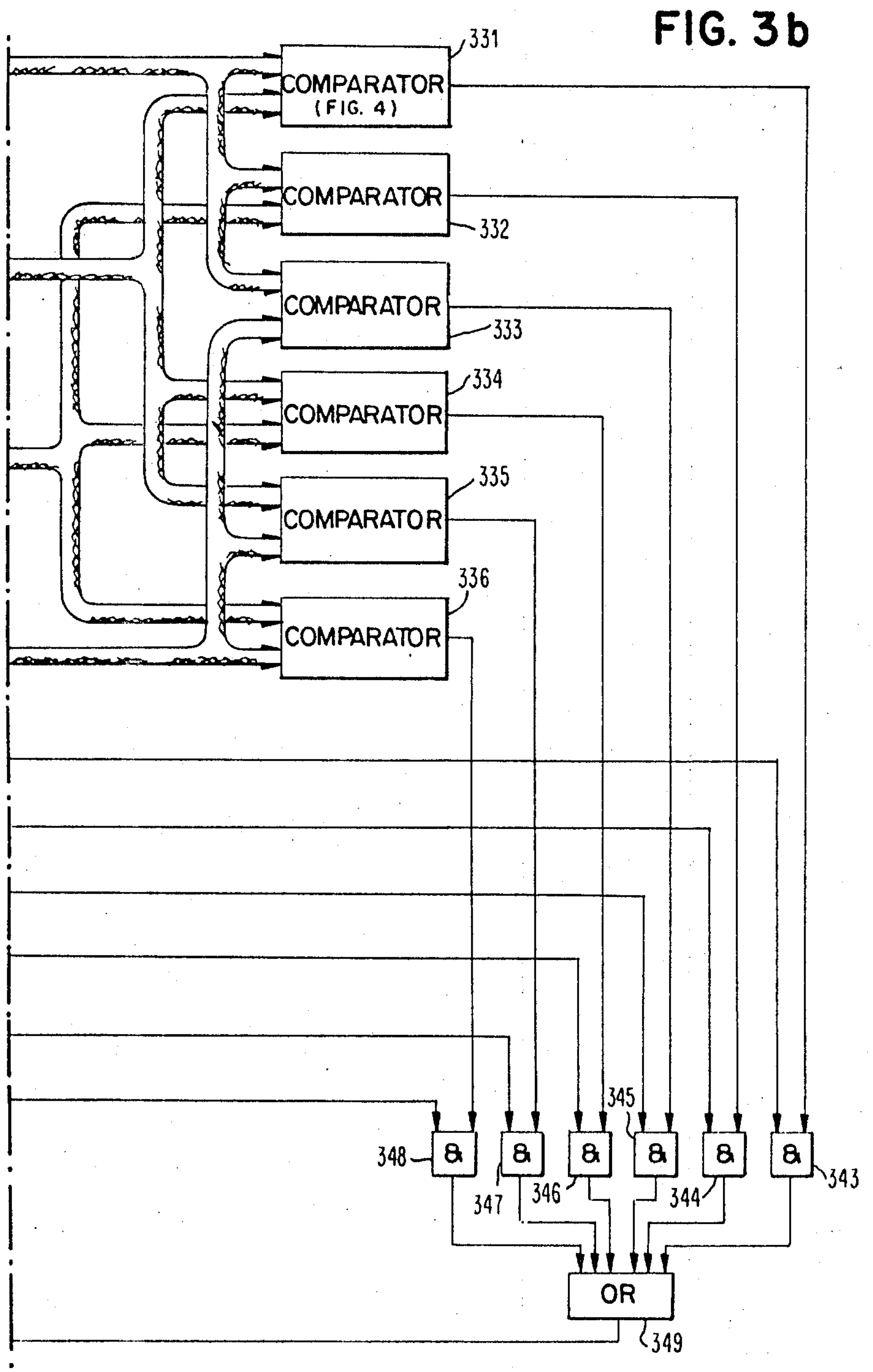
Figure 3:
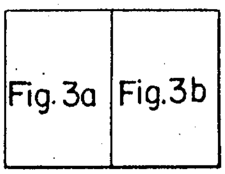

Illustrated in FIG. 1 is an application of the preferred embodiment of the invention (the invention itself is color-encoder 123 more particularly illustrated in FIG. 3). The combination of drum 101 and color-decoder 123 is more fully described in an application now pending in the U.S. Patent Office, Ser. No. 762,517, now U.S. Pat. No. 3,572,945. Briefly, according to the preferred embodiment, in the scanning means drum 101 carries a document 103. Drum 101 is forced to rotate by a motor (not shown) under the control of shaft encoder 105 which in turn is controlled by clock 107 through line 109. Drum 101 is scanned by an optically scanning means 110. In the preferred scanning means 110 the image of document 103 is focused by lens 111 on fiber optics sets 113 and 115 through dichroic mirror 117. Both fiber optics sets 113 and 115 scan the exact same area of document 103. One fiber optic from each of fiber optics sets 113 and 115 (containing nine fibers in the preferred embodiment) scans the same specific region in the area (4 mil × 4 mil region is preferred). Thus, in the preferred embodiment the fiber optics sets 113 and 115 each cover an area 4 mils × 36 mils. The photocells 119 and 121 indicate the value of the light received through their respective fiber optic, i.e. positive, zero, or negative. As explained in the Thompson application cited above, the output of each photocell is converted to a zero voltage when that photocell is scanning a background color. When a photocell is subject to a greater energy than that present when background is being scanned the photocell output is converted to a positive voltage. When the energy received by a photocell is less than that received when background is being scanned, the output of the photocell is converted to a negative voltage. Since the preferred application of the Thompson invention is scanning maps which have colored lines drawn on a material which reflects as the background color, regions of color are generally bounded by regions containing background, unless lines of two different colors cross. Because of this characteristic of the color data to be encoded, the present invention advantageously minimizes the quantity of data which must be encoded in order to reproduce the scanned document. Amplifiers and color-decoder 123 compare the two signals for each region of document 103 detected through photocells 119 and 121 and decode the region's respective color. In the preferred embodiment each of the colors is represented in parallel digital form, thus necessitating three lines for the eight possible colors. Thus, the outputs from the color-decoder are a plurality of digitally encoded electrical output signals, having a different digital value representative of each of said colors, including the background color. The digitally encoded signals are presented on 24 lines (three lines per color in parallel form) which form the input for color-encoder 131 (more fully shown in FIG. 3 and the description in conjunction therewith). After drum 101 has completed one rotational scan, the scanning system 110 is indexed laterally in order that only the last region scanned will be rescanned during the subsequent rotational scan.

The embodiment shown of the scanning and color-decoding means and described in the above-mentioned application need be modified only with respect to the timing supplied by clock 107 through line 125. Data compactor 127 removes every other bit of information both in the horizontal and vertical directions in such a manner that color-decoder 123 need only detect every other line in the rotational direction. Therefore, in the preferred embodiment, a timing signal on line 125, will gate color-decoder 123 to produce an output every other line, i.e., in the preferred embodiment once every 8 mils.

The outputs of photocells 119 and 121 scanning the identically same region on document 123 are combined by positive-negative OR's 129. These circuits produce a positive output if either or both of their inputs have any value other than zero. The outputs of these positive and negative OR's 129 form the input to data compactor 127 (more fully described in FIG. 2 in accompanying description). Also, clock 107 provides timing signals through cable 133 to data compactor 127. Both color-decoder 123 and data compactor 127 form separate inputs to color-encoder 131 (more fully described in conjunction with FIG. 3 in the accompanying description). Timing signals are provided through timing line 135 from clock 107 to color-encoder 131.

The encoded data is transmitted through cable 137 to be written by tape unit 139 on magnetic tape (or any other well-known storage means such as core storage, capacitor-only storage, etc.).

Figure 2:
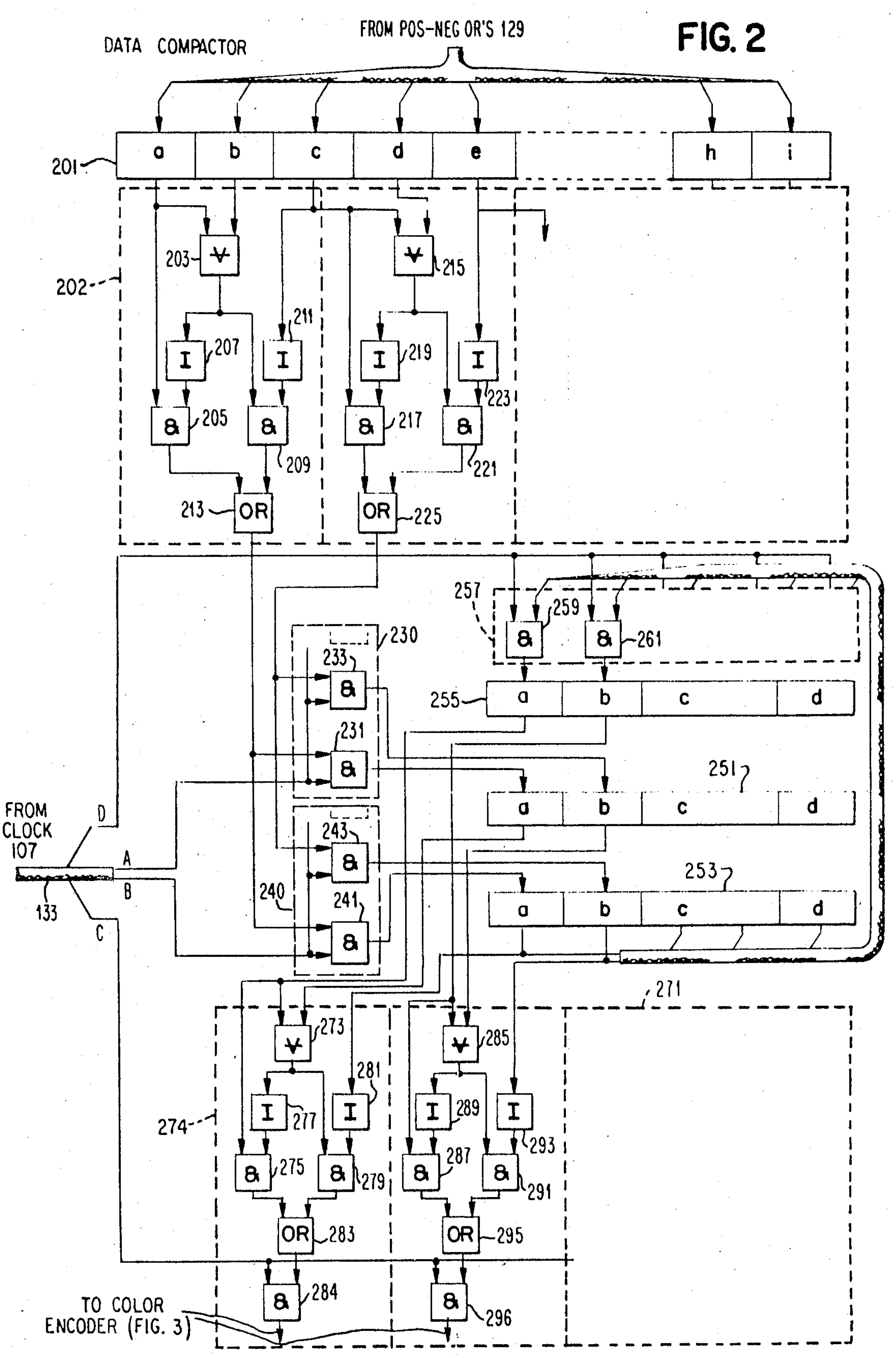
FIG. 2 is a more detailed description of the data compactor 127 of FIG. 1.

A more complete description of the operation of the circuit illustrated in FIG. 1 will begin after the detailed description of FIG. 2 and FIG. 3.

DESCRIPTION OF FIG. 2

The preferred embodiment of the data compactor is illustrated. The outputs from positive-negative OR's 129 form the inputs to the individual stages of register 201. In the preferred embodiment register 201 contains nine stages, one for each area scanned on document 103.

The logic illustrated in FIG. 2 is shown for only the first five stages of register 201. It will become obvious from the following discussion that the completion of the logic diagram is only a mere duplication of the circuit already illustrated, and the missing stages are deleted from FIG. 2 for purposes of clarity. The output of the first stage of register 201 forms an input to both Exclusive-OR 203 and AND circuit 205. The other input to Exclusive-OR 203 is formed by the output from the second stage of register 201. The output of Exclusive-OR 203 forms the input to inverter 207 and an input to AND 209. The output of inverter 207 forms the other input to AND circuit 205. The logic associated with the first three stages of register 201 is completed by inverter 211 which inverts the output of the third stage, **201*c*, and whose output forms the other input to AND circuit 209. The outputs of AND circuit 205 and 209 form the inputs to OR circuit 213**.

The output of OR circuit 213 forms an input of AND circuit 231 and AND circuit 241. The output of OR circuit 225 forms an input to AND circuit 233 and AND circuit 243. Similarly, each functional logic circuit output of circuitry 202 forms an input to both an AND circuit in circuitry block 230 and circuitry block 240. The other input for the AND circuits in circuitry block 230 is formed by timing line 133A, a line contained in cable 133 from clock 107. The other input to the AND circuits contained in circuitry block 240 is timing line 133B, a line contained in cable 133 from clock 107. The outputs from each AND circuit of circuitry block 230 forms an input to a stage of register 251. Similarly, the output from each AND circuit of circuitry block 240 forms an input to register 253. More specifically, the output of AND circuit 231 forms the input for stage **251*a*, the output of AND 233 forms the input for stage 251*b*, the output of AND 241 forms the input for stage 253*a*, and the output of AND 243 forms the input to stage 253*b*. The stages of register 253 form inputs both to circuitry block 271 and circuit block 257. Referring to the latter circuitry block each stage of shift register 253 is associated as an input to one AND circuit in circuitry block 257. That is, stage 253*a* forms an input to AND circuit 259, the output from stage 253*b* forms an input to AND circuit 261, etc. The other input to each of the AND's in circuitry block 257 is formed by the D timing signal, a line in cable 133**.

Referring now to circuitry block 271, it is seen that it is made up of the same logical blocks as is circuitry block 202. That is, circuits 273–283 are identical in composition and connection as are circuits 203–213. Therefore, no further description of the separate functional blocks of circuitry block 271 will be given except that the outputs of each of the final OR's in each functional block forms an input to an AND circuit so as to gate the final outputs of the date comparator in FIG. 2. That is, the output of OR circuit 283 forms an input to AND circuit 284, the output of OR circuit 295 forms an input to AND circuit 296, etc. The other input of the final AND circuits in circuitry block 271 is formed by timing signal C, a line in cable 133.

OPERATION OF FIGURE 2

Circuitry 203–213 examines the first three stages of register 201 and produces an output logically identical to stage **201*a* if stages 201*a* and stages 201*b* are logically identical. If the latter two stages are not logically identical, the output of circuitry 203–213 is a logical inverse of stage 201*c***.

Similarly, circuitry 215–225 performs the identical function with respect to stages **201*c*, *d*, and *e* as did circuitry 203–213 with respect to stages 201*a–c*. By examining the pattern exhibited by the above-described circuitry, a single output is produced from logic circuitry 202 for every two inputs from stages of register 201. Thus, logic circuitry 202 reduces the data in register 201 by half. As also can be seen from the above description an additional bit of data contained in stage 201*i* may be needed to correctly determine the data which is to replace the contents of stages 201*g* and *h*. As was explained in the description of FIG. 1 the scanning network composed of drum 101, lens 111, etc. overlaps one square scan area during every cycle. Thus, the contents of stage 201*i* will be identical to the contents of stage 201*a* when the drum assumes the same angular position during the next cycle. One skilled in the art will see that upon the occurrence of a timing signal on line 133A the logical conditions contained on the outputs from circuitry block 202 will be loaded into register 251. Similarly, upon the occurrence of a timing signal on line 133B the logic conditions then on the outputs of circuitry block 202 will be loaded into register 253. Upon the occurrence of a timing signal on line 133D, the contents of register 255 will assume the same values as that contained in register 253**.

The function of circuitry block 271 is the same as that of circuitry block 202. Further examination will show that as circuitry block 202 reduced two stages of register 201 to one signal by examining those two stages and the following stage, so does circuitry block 271 reduce comparable stages of register 251 and register 253 to one data bit by examining those two registers with the comparable stages of register 255. The final output of circuitry block 271, and the final output of the data compactor in FIG. 2, is gated by timing line 133C.

DESCRIPTION OF FIGURE 3

Referring now to FIG. 3 the preferred logic embodiment of the color-encoder is illustrated. Although the preferred embodiment shows the encoding of four separate regions, each of eight possible colors, one skilled in the art could easily generalize the invention to more or less regions, or more or less colors. Moreover, the preferred embodiment uses parallel processing, but here again, one skilled in the art could easily convert to serial processing.

The colors representing each of the four separate regions are brought in upon lines 301, 302, 303, and 304, respectively from color-decoder 123. The two main functions are performed by the color-encoder, first the detection of the presence or absence of a color (i.e. background color) and, if present, the color of the first region which is nonbackground color; and second, the detection of whether any other region contains a different color than the first color detected.

With respect to the detection of the presence or absence of a color, lines 301 form inputs to OR 305, lines 302 form inputs to OR 306, lines 303 form inputs to OR 307, and lines 304 form inputs to OR 308. It can be seen if any one of the set of three lines is up, indicating the presence of a color in the monitored area the OR circuit will produce an output (the outputs of the OR's could be stored in a register as is done in FIG. 7).

With respect to the detection of the color of the first area of the four which contains a color, each one of lines 301 forms the input to one of AND circuits 309, 310, and 311. The output of OR circuit 305 forms the other input to each of these AND circuits and also to an inverter 312. It is seen that if any one of the lines 301 is up, indicating a color, AND circuits 309, 310, and 311 will be conditioned such that their outputs will represent the inputs formed by line 301.

Similarly, the inputs to AND circuits 313, 314, and 315 are formed by a different line of lines 302. However, the other inputs to these latter AND circuits are formed by the output of AND circuit 316 whose inputs are formed by the outputs of inverter 312 and OR circuit 306.

As was the case with lines 302, lines 303 form a similar network. That is, each line of lines 303 forms an input to a different AND among AND's 317–319. The other input of these latter AND's is formed by the output of AND 321 whose inputs in turn are formed by the inverted output of OR circuit 305, the inverted output of OR circuit 306, and the output of OR circuit 307.

Lastly, a similar network is formed with respect to lines 304. Each line of lines 304 performs an input to a different AND among AND's 322–324. The other input of these AND's is formed by the output of AND 326 whose inputs in turn are formed by the inverted outputs of OR's 305, 306, and 307 and the output of OR 308.

Thus, the first set of lines which carry a signal representing a color (any one or more of the lines of a set of lines being in an up state) will inhibit the circuitry associated with the following sets of lines from passing any signals carried by them.

Thus, only one set of AND's can produce outputs simultaneously. The outputs from comparable AND's in each of the sets are combined, from AND's 309, 313, 317, and 322 by OR 327, from AND's 310, 314, 318, and 323 by OR 328, and from AND's 311, 315, 319, and 324 by OR 329. Each output from OR's 327–329 forms an input to a different stage of register 330. Thus the logic circuits select the digitally encoded signal corresponding to the first region containing a nonbackground color and supply that signal at the input to register 330. Thus, in the first three stages of register 330, there is stored the representation of the first color among the four spots which form an input to the circuitry of FIG. 3.

In the preferred embodiment, the second detection function of the color-encoder is to indicate that if two or more of lines 301, 302, 303, or 304 indicate colors, whether the colors so indicated are identical. The circuitry performing this color comparison is shown in the right half of FIG. 3. Lines 301 form an input to comparators 331, 332, and 333. Lines 302 form an input to comparators 331, 334, and 335. Lines 303 form an input to comparators to 332, 334, and 336. Lines 304 form inputs to comparators 333, 335, and 336.

Figure 4:
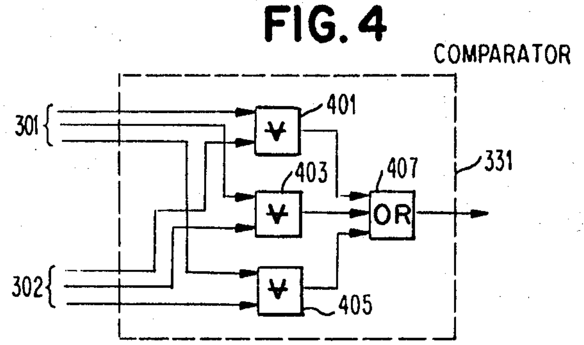
FIG. 4 is a more detailed drawing of one of comparators 331–336 of FIG. 3.

For a description of each of the comparators reference should be made to FIG. 4. As an example comparator 331 is illustrated. Lines 301 and 302 form the inputs to comparator 331. In turn each line of lines 301 forms an input to a different one of Exclusive-OR's 401, 403, or 405. The other input to each of the Exclusive-OR's is formed by a different line from lines 302, such that the line from lines 301 and the line from lines 302 are of the same order. The outputs from the Exclusive-OR's form the inputs to OR 407. The output from OR 407 forms the output of comparator 331.

Referring both to FIGS. 3 and 4, to those skilled in the art the comparator among comparators 331–336 will have an output only when the inputs to that Exclusive-OR do not contain identical signals, i.e. the colors represented on the lines are not similar.

Also included in the color comparison function are AND circuits 337–342. Inputs to AND 337 is formed by the outputs of OR 305 and 306. The inputs to AND 338 are formed by the outputs of OR 305 and 307. The inputs to AND 339 are formed by the outputs of OR 305 and 308. The inputs to AND 340 are formed by the outputs of OR 306 and 307. The inputs of AND 341 are formed by the outputs of OR 306 and 308. Finally, the inputs of AND 342 are formed by the outputs of OR 307 and 308.

Thus, an AND circuit among AND's 337–342 will produce an output only when the color cables with which it is associated both contain a color.

The output of comparator 331 along with the output of AND 337 forms an input to AND 343. It should be noted that the inputs to comparator 331 are cable 301 and 302. Similarly, AND circuit 337 is associated with cables 301 and 302 through OR's 305 and 306, respectively. Similarly, the outputs from comparator 332 and AND 338, both associated with cables 301 and 303, form the inputs to AND 344; the output from comparator 333 and AND 339, both associated with cables 301 and 304, form the inputs to AND 345; the outputs of comparator 334 and AND 340, both associated with cables 302 and 303, form the inputs to AND 346; the outputs of comparator 335 and AND 341, both associated with cables 302 and 304, form the inputs to AND 347; and the outputs of comparator 336 and AND 342, both associated with cables 303 and 304, form the inputs to AND 348.

AND's 343–348 will only produce an output if the cables with which it is associated both contain a color (determined by OR's 305–308 in conjunction with AND's 337–342) and the colors are different (determined by comparators 331–336).

The outputs of AND's 343–348 form the inputs to OR 349. The output or OR 349 forms the input to the last stage of register 330.

OR 349 will have an output only if two or more cables among cables 301–304 contain a color and the colors are different. This output is stored in the last stage of register 330.

Each stage of register 330 forms an input to a different AND among AND's 350–353. The other input to each of the AND's is formed by line 135 from clock 107 (FIG. 1).

Thus, the timing signal on line 135 gates the contents of register 330 out of color-encoder 131 and into tape unit 139 (see FIG. 1).

OPERATION OF FIGURE 3

The colors for the four regions are contained upon lines 301–304. The detection of the presence or absence of a color on each of the lines is performed by OR circuits 305–308, respectively. The first line of the four which contains a color, other than the background color, inhibits the following lines from conducting their color into register 330 through the inverter associated with that line (one of inverters 312, 320, and 325) and the AND circuit associated with the following lines (AND 316, 321, and 325).

The second detection function of the color-encoder indicating whether two or more lines had different colors, is performed by the circuitry in the right half of FIG. 3. Comparators 331–336 compare the colors contained on the various lines and indicate if any two lines have different contact (this includes indicating a difference if one line has background and another has color). If there is a difference, the comparators produce an output, but this output is not stored unless both lines which form the input to that comparator have colors contained thereon. This is done by comparing the outputs from OR's 305–308, which indicate the presence of a color, to each other by AND's 337–342. If the two lines compared both have a color, the output from the comparator among comparators 331–336 which the same two lines form an input, is allowed to pass into the last stage of register 330 through AND's 343–348 and OR 349.

Register 355 contains the output of data compactor 127. Both registers 330 and 355 are gated out of color-encoder 131 by a timing pulse appearing on line 135.

It must again be stressed at this point that FIG. 3 only comprises one-half of the comparator as used in this application. That is, there are eight lines forming an input from color-decoder 123 to color-encoder 131, the apparatus of FIG. 3 handling only four of those eight lines.

EXAMPLE

Figure 5:
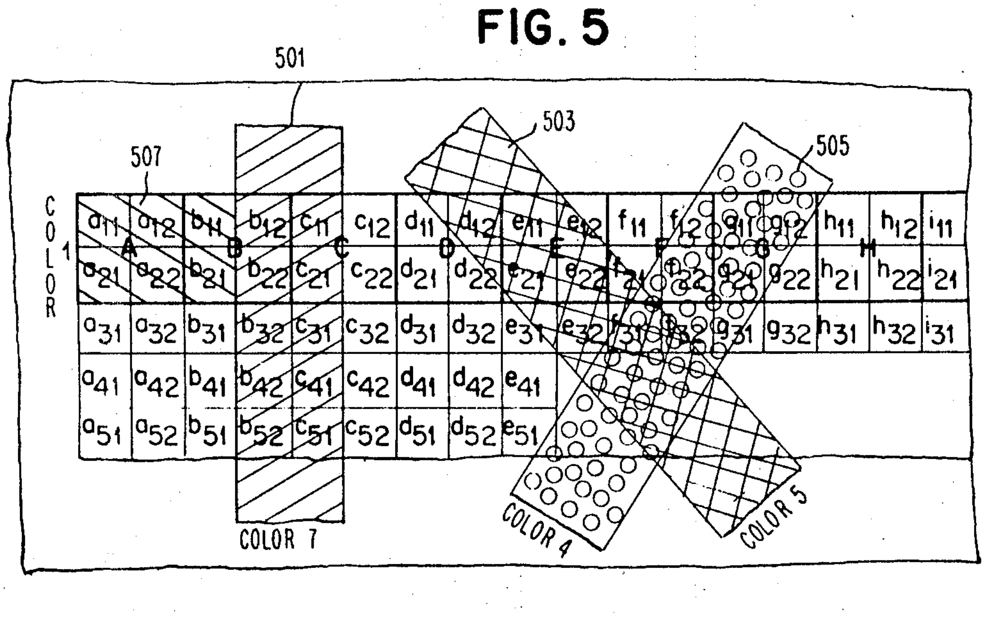
FIG. 5 is an illustration of a section of a typical document scanned by the invention.

Referring to FIG. 5 a sample document to be scanned is illustrated. The area of concern consists of four lines, each of a different color. The leftmost line, line 507, is of color 1. By this it is meant that amplifiers and color-decoder 123 will have an output of the number 1 to represent the color of line 507. Similarly, line 501 is of color 7 and line 503 is of color 5. The last line, line 505, is of color 4.

During the first scan fiber optic sets 113 and 115 will cover the area delineated from $a_{11}$ to $e_{11}$. For ease of reference the area delineated by $a_{11}$, $a_{12}a_{21}$, and $a_{22}$ will be labeled A. Similarly, the area delineated by $b_{11}$, $b_{12}$, $b_{21}$, and $b_{22}$ will be delineated B; and so forth for C, D, E, F, G, and H.

During the first scan fiber optics sets 113 and 115 will both cover the row delineated by $a_{11}, a_{12}, \ldots, e_{11}$, an area of 4 mils × 36 mils. Each fiber optic in optics sets 113 and 115 transmits the reflected color light into detectors 119 and 121, respectively. The light values detected by photocells 119 and 121 are decoded by amplifiers and color-decoder 123. All but the last region, $e_{11}$, is so decoded. When a time pulse occurs on line 125 (every other row), there will appear on the eight lines at the output of color-decoder 123 the values 1, 1, 1, 7, 7, 0, 0, 5 in binary form (0 indicating background).

The outputs from comparable photocells 119 and 121 are combined by a positive-negative OR's 129. As defined above positive-negative OR's 129 produce an output whenever either of their inputs have other than a zero value. Thus, if a color other than the background color is being scanned by the respective optic in fiber optics sets 113, 115, the positive-negative OR will have an output. Thus, the outputs from positive-negative OR's 129 will be 1, 1, 1, 1, 1, 0, 0, 1, and 1. These are fed into the stages of register 201 of data compactor 127 illustrated in FIG. 2. Each of the functional blocks in circuitry block 202 will perform the logical function as described above. That is, the output from OR 213 will be a logical 1, that from 225 will be a logical 1, etc. Upon the occurrence of a timing pulse on line 133B the outputs of circuitry block 202 will be loaded into register 253. Referring to the timing diagram in FIG. 6 it is seen that a timing pulse occurs on line 109 indicating that drum 101 is aligned and simultaneous timing pulses occur on lines 125 and 133B. Shortly thereafter timing pulse appears on line 133D causing register 255 to assume the state of register 253 (i.e. line $a_{11}, a_{12}, \ldots, e_{11}$).

Similarly, when another timing pulse 109 occurs indicating that row $a_{21}, a_{22}, \ldots, e_{21}$ is aligned with the fiber optics a timing pulse 133A occurs. This causes the stages of register 251 to assume the logical conditions 1, 1, 1, and 0. Lastly, another timing pulse occurs on 109 and 133B causing register 253 to assume logical configuration of row $a_{31}, a_{32}, \ldots, e_{31}$; that is, 0, 0, 1, and 0.

The outputs from each of the functional blocks of circuitry block 271 produce an output which upon the occurrence of a timing pulse on line 133C presents an input to the color-encoder 131 illustrated in detail in FIG. 3. As mentioned above and as can be seen from FIG. 2, circuitry block 271 combines the contents of registers 255, 251, and 253. These registers have assumed the condition shown in Chart I. The four outputs from circuitry block 271 are shown in the last line of Chart I.

CHART I

| | | | | |
|---|---|---|---|---|
| 1 | 1 | 1 | 0 | register 255 |
| 1 | 1 | 1 | 0 | register 251 |
| 0 | 0 | 1 | 0 | register 253 |
| 1 | 1 | 1 | 0 | output of 271 |

As mentioned above amplifiers and color-decoder 123 are placed on four lines and form the input to color-encoder 131. One-half of color-encoder 131 is illustrated in FIG. 3. The four colors that are fed into FIG. 3 on lines 301–304 are processed in accordance with the description of the logic above and the resultant is stored in register 330. The first four colors as given above sampled and transmitted by 123 is 1, 1, 1, and 7. In accordance with the above description the stages of register 330 assume the condition 0, 0, 1, and 1. The first three digits 001 represent the first color among the four, that is, color 1. The last digit, 1, represents that among the colors sampled in the four large areas, at least two are different.

Figure 6:
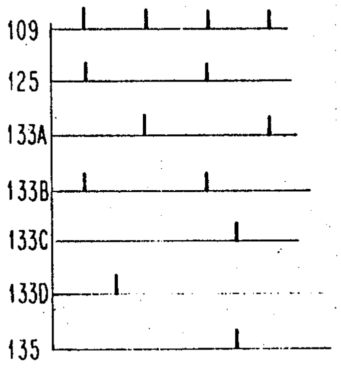
FIG. 6 is a timing diagram for FIG. 1.

Also as described above the stages of register 355 have assumed the conditions of the first two outputs of data compactor 127, that is 1, 1. Upon a timing signal on line 135 as shown in FIG. 6 the contents of register 330 and 355 will be passed by AND's 350–353, 357 and 350 into tape unit 139 and written on tape.

It must be remembered, that FIG. 3 only represents one-half of color-encoder 131, the other half operating in exactly the same manner for the other four outputs of amplifier and color-decoder 123 and the other two outputs of data compactor 127. Together both halves account for the four output lines of data compactor 127 and eight color output lines from amplifier and color-decoder 123. Decoded on tape for areas A, B, C, and D will be the data illustrated in Chart II. Line 2 records the color information for the first two bits of line 1 and line 3 records the color information for the last two bits of line 1.

CHART II

| | | | |
|---|---|---|---|
| 1 | 1 | 1 | 0 |
| 0 | 0 | 1 | 1 |
| 1 | 1 | 1 | 1 |

Similarly, the scanning network continues to scan mixed scanning row $a_{41}$, $a_{42}$, . . ., $e_{41}$, etc. to complete a rotational scan of the document.

During the next rotational scan row $e_{11}$, $e_{12}$, . . ., $i_{11}$ will be scanned. After row $e_{31}$, $e_{33}$, . . ., $i_{31}$ has been scanned registers 251–255 will assume the configuration shown in Chart III; and the output of circuitry block 271 will also be as shown.

CHART III

| | | | | |
|---|---|---|---|---|
| 1 | 0 | 1 | 0 | register 255 |
| 1 | 1 | 1 | 0 | register 251 |
| 0 | 1 | 0 | 0 | register 253 |
| 1 | 0 | 1 | 0 | output of 271 |

Similarly, the color associated with E is color 5 and that associated with G is color 4. The information recorded on tape for area E, F, G, and H is shown in Chart IV.

CHART IV

| | | | |
|---|---|---|---|
| 1 | 0 | 1 | 0 |
| 1 | 0 | 1 | 0 |
| 1 | 0 | 0 | 0 |

A further problem may be seen in that D should be all one color from Chart III whereas in reality from FIG. 5 only $b_{11}$ and $b_{21}$ are color 1. This would cause line 507 to overlap line 501, whereas in reality they are but in the middle of B. These dichotomies are solved by a technique called "line following" through programming on a computer. That is, the information stored on tape as encoded by color-encoder 131 is read off by a computer, which controls a line plotter. Before the plotter is given information, the computer scans for any dichotomies such as exist in B and also at $f_{31}$ and $f_{32}$. For more information on this subject see Roger F. Tomlinson, "Introduction to the Geographic Information of the Canadian Land Inventory," ASP/ACFM, Washington, D. C., Mar. 7, 1967.

DESCRIPTION OF FIGURE 7

Figure 7:
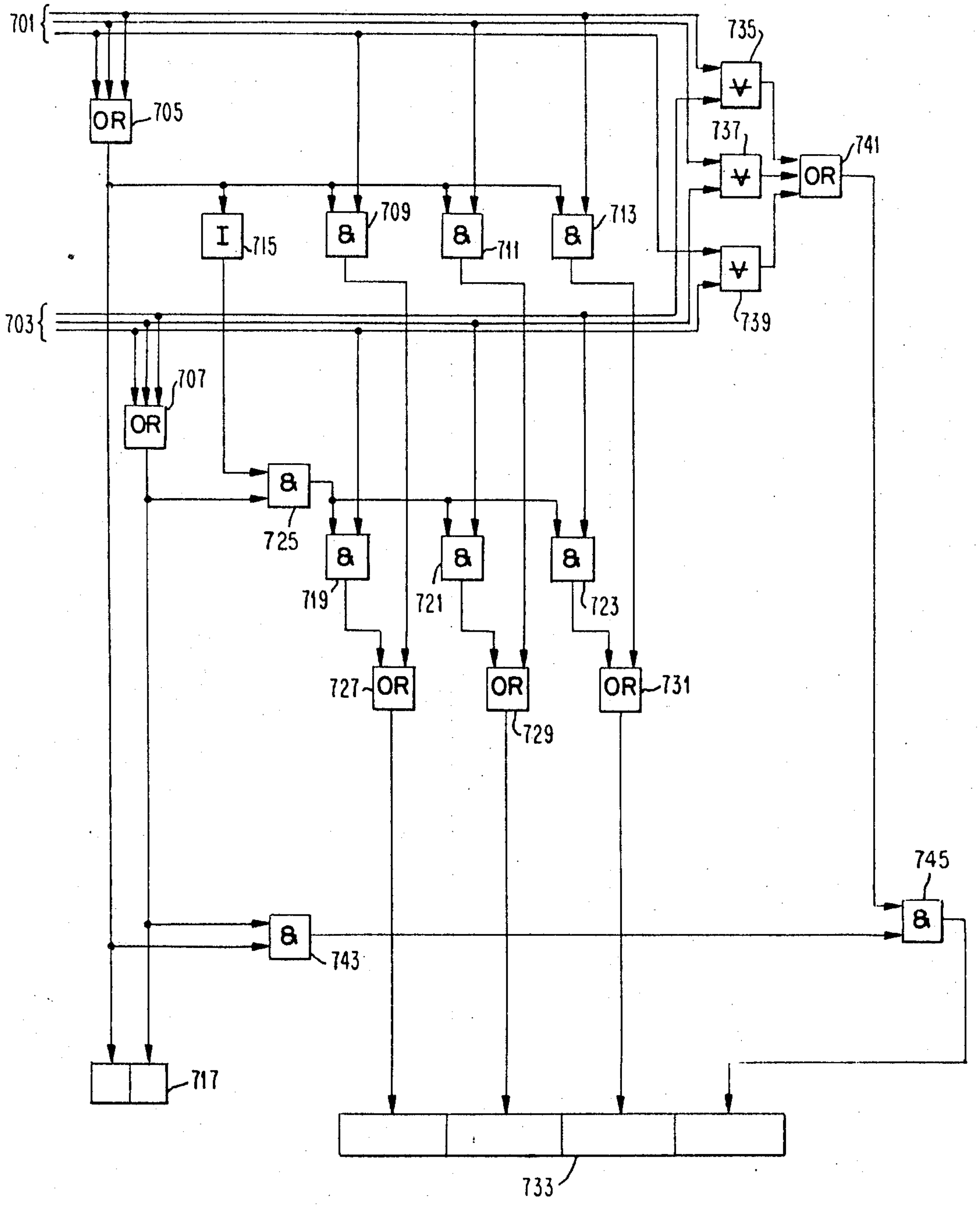
FIG. 7 is another embodiment of the invention.

Referring now to FIG. 7 the preferred logic embodiment of one-half the color encoder is illustrated. The other half is identical to this half. Although the preferred embodiment encodes four separate spots, each of eight possible colors, one skilled in the art could easily generalize the invention to more or less spots, or more or less colors. Moreover, the preferred embodiment uses parallel processing, but here again, one skilled in the art could easily convert to serial processing.

The colors representing each of the two separate areas are brought in upon lines 701 and 703. Two main functions are performed by the color-encoder, the indication of the presence or absence of a color and the color of the first area which is nonwhite.

OR's 705 and 707 are used for an indication of the presence or absence of a color, lines 701 form inputs to OR 705, and lines 703 form inputs to OR 707. It can be seen if any one of the set of three lines is up, indicating the presence of a color in the monitored area, the OR circuit will produce an output.

With respect to the storage of the color of the first area of the four which contains a color, each one of lines 701 forms the input of one of AND circuits 709, 711, and 713. The output of OR circuit 705 forms the other input to each of these AND circuits and also to an inverter 715. It is seen that if any one of the lines 701 is up, indicating a color, AND circuits 709, 711, and 713 will be conditioned such that their outputs will represent the inputs formed by lines 701.

Similarly, the inputs to AND circuits 719, 721, and 723 are formed by a different line of lines 703. However, the other inputs to these latter AND circuits are formed by the output of AND circuit 725 whose inputs are formed by the outputs of inverter 715 and OR circuit 707.

Thus, the first set of lines which carry a signal representing a color (any one or more of the lines of a set of lines being in an up state) will inhibit the circuitry associated with the following sets of lines from passing any signals carried by them.

Thus, only one set of AND's can produce outputs simultaneously. The outputs from comparable AND's in each of the sets are combined, from AND's 709 and 719 by OR 727, from AND's 711 and 721, and from AND's 713 and 723 by OR 731. Each output from OR's 727–731 forms an input to a different stage of register 733. Thus, in the first three stages of register 733 there is stored the representation of the first color among the two spots which form an input to the circuitry of FIG. 7.

Also, in the preferred embodiment, the color-encoder performs an additional function. This is to indicate that if both the lines 701 and 703 indicate colors, whether the colors so indicated are identical. The circuitry performing this color comparison is shown in the right half of FIG. 7. Each line of lines 701 forms an input to a different one of Exclusive-OR's 735, 737, or 739. The other input to each of the Exclusive-OR's is formed by a different line from lines 703, such that the line from lines 701 and the lines from lines 703 are of the same order. The outputs from the Exclusive-OR's form the inputs to OR 741. To those skilled in the art OR 741 will have an output only when the inputs to the Exclusive-OR's do not contain identical signals, i.e. the colors represented on the lines are not similar. Thus, an AND 743 will produce an output only when the color cables with which it is associated both contain a color.

The output of OR 741 along with the output of AND 743 forms an input to AND 745. AND 743 will only produce an output if the cables with which it is associated both contain a color (determined by OR's 705 and 707 in conjunction with AND 743) and the colors are different (determined by Exclusive-OR's 735–739). The output of AND 745 forms the input to the last stage of register 733.

OPERATION OF FIGURE 7

FIG. 7 operates identically to that of the color-encoder in FIG. 3 except for register 717. A register comparable to register 717 is not present in FIG. 3. The function performed by register 717 is performed in the slightly superior fashion by data compactor 127 which is illustrated in more detail in FIG. 2. However, the information recorded in register 717 is essentially the same information, except possibly for some errors in accuracy, as that recorded in register 355. That is, register 717 essentially records which regions contains a color and which regions contain only background.

Because of the similarity of operation of FIG. 7 with that of FIG. 3 no detailed operation and example is given.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method of encoding with a minimum of data the color patterns on a multicolored document consisting of colors on a background color including the steps of:

scanning a group at least two of contiguous regions to derive electrical output signals indicative of the color of each region scanned;

deriving from the electrical output signals what color is present in each scanned region and producing a set of digitally encoded electrical output signals specifying the color which is present in each scanned region including the background color, said digitally encoded electrical output signals having different digital values representative of each of said colors including the background color;

selecting from the set digitally encoded output signals produced during said deriving step the first set whose digital value is representative of a color other than the background color; and storing the selected digitally encoded output signal only one digitally encoded output signal from the set of digitally encoded output signals being stored for the group of contiguous regions being scanned.

2. The method of claim 1 further comprising the steps of:

comparing the digitally encoded electrical output signals to determine whether any other digitally encoded output signal produced during the deriving step has a digital value representative of any other nonbackground color and producing an electrical output signal which specifies the result of said comparison; and storing the electrical output signal which specifies the result of said comparison.

3. The method of claim 2 further comprising the steps of:

determining from the digitally encoded output signals which regions contain a color other than the background color and which contain the background color; and storing the information resulting from said determining step.

4. A device for encoding with a minimum of data the color patterns of a multicolored document consisting of colors and a background color including:

scanning means scanning a group at least two of regions and producing electrical output signals indicative of the color of each of the regions being scanned;

color-decoding means connected to the output of the scanning means said decoder means determining from the electrical output signals of the scanning means what color is present in each scanned region and producing a set of digitally encoded electrical output signals specifying the color which is present in each scanned region including the background color, said digitally encoded electrical output signals having a different digital value representative of each of said colors including the background color;

means responsive to the digitally encoded electrical output signals produced by the color-decoding means for selecting the first digitally encoded output signal from said color-decoding means whose digital value is representative of a color other than the background color; and first storage means for recording the selected digitally encoded output signals, only one digitally encoded output signal from the set of digitally encoded output signals being stored for the group of regions being scanned.

5. A device for encoding with a minimum of data the color patterns of a multicolored document consisting of colors and a background color, comprising:

scanning means scanning a group of regions of equal area and producing electrical output signals representative of the color values in each of said regions;

a plurality of color-decoding means, connected to the output of the scanning means, each color-decoding means determining from the electrical output signals of the scanning means what color is present in the scanned region with which it is associated and producing a color-indicating output signal specifying the color which is present, whenever the color is other than background;

first detection means responsive to the outputs of the color-decoding means for determining the first region containing a color other than the background color and for presenting at the detection means output a signal indicating the color present in that region, said first detection means comprising a plurality of gate means responsive to the output of the color-decoding means; one gate means being associated with each of the color-decoding means, except for the color-decoding means associated with the first region scanned; each gate means being responsive to each of the color-decoding means associated with preceding regions; and each gate means passing to the output of the first detection means the color-indicating signal from the color-decoding means with which it is associated whenever none of the color-decoding means associated with previous regions has produced an output indicating a color other than background;

first storage means responsive to the signal at the output of the first detection means for recording the color of the region determined by the first detection means;

a second detection means responsive to the outputs of the color-decoding means for producing an output when any region contains a color, not including background, other than the color of the region determined by the first detection means; and second storage means responsive to the second detection means for recording the output of the second detection means.

6. A device as in claim 5 wherein said scanning means scan a group of contiguous regions of equal area.

7. A device as in claim 6 including:

comparison means responsive to the digitally encoded electrical output signals produced by the decoding means for determining whether any other digitally encoded output signal from the color-decoding means has a digital value representative of any other background color, said comparison means producing an electrical output signal specifying the result of said comparison; and, second storage means responsive to the comparison means for storing the result of said determination.